United States Patent [19]

Rho

[11] Patent Number: 4,757,304
[45] Date of Patent: Jul. 12, 1988

[54] VEHICLE SECURITY SYSTEM

[75] Inventor: Ki-Ick Rho, Seoul, Rep. of Korea

[73] Assignee: San Sung Electronics Co. Ltd., Rep. of Korea

[21] Appl. No.: 911,572

[22] Filed: Sep. 25, 1986

[30] Foreign Application Priority Data

Sep. 25, 1985 [KR] Rep. of Korea ............... 85-7018

[51] Int. Cl.$^4$ ................... G08B 19/00; B60R 25/00
[52] U.S. Cl. ........................... 340/522; 340/63; 340/565; 340/539; 340/696; 340/666
[58] Field of Search ............. 340/522, 521, 565, 63, 340/64, 65, 539, 696, 666, 667; 455/603, 600

[56] References Cited

U.S. PATENT DOCUMENTS

| | | | |
|---|---|---|---|
| 3,703,714 | 11/1972 | Andrews | 340/63 |
| 4,143,368 | 3/1979 | Route et al. | 340/63 |
| 4,364,030 | 12/1982 | Rossin | 340/565 |
| 4,464,651 | 8/1984 | Duhame | 340/522 |
| 4,594,580 | 6/1986 | Nelson | 340/696 |

Primary Examiner—Donnie L. Crosland
Attorney, Agent, or Firm—Handal & Morofsky

[57] ABSTRACT

There is provided a vehicle security system which is especially useful for night workers to secure themselves against burglars previously hidden their vehicles, comprising a sensing unit for detecting the presence of the burglar, and a warning unit for providing a warning to the burglar. Preferably, the security system has a remote control transmitter.

7 Claims, 3 Drawing Sheets

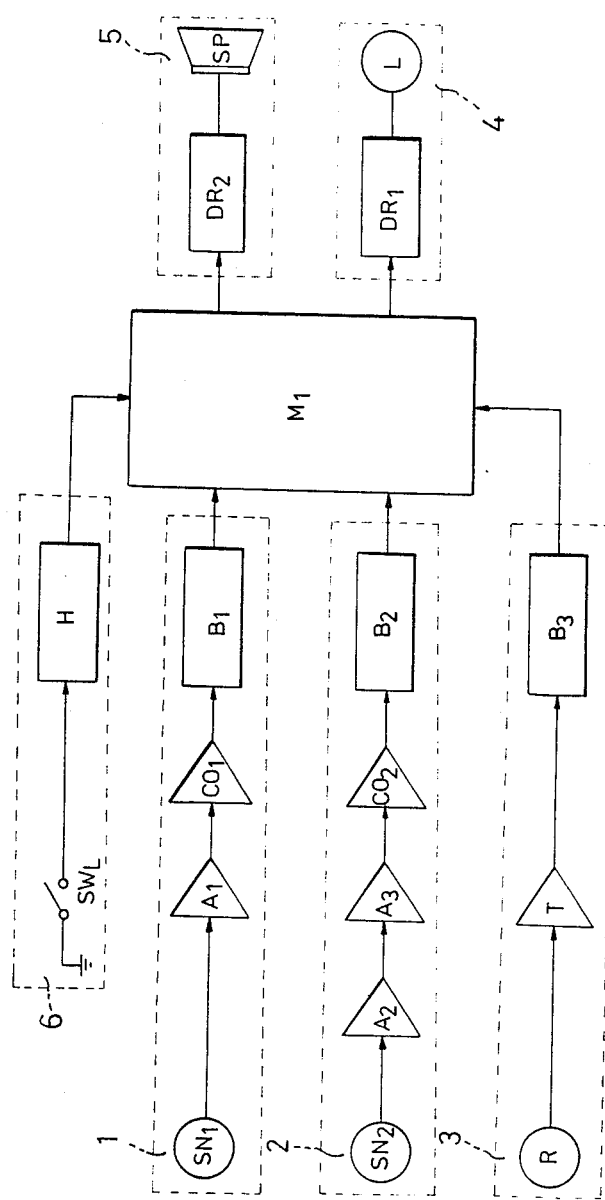
FIG. 1A (RECEIVER)

FIG.1B (TRANSMITTER)
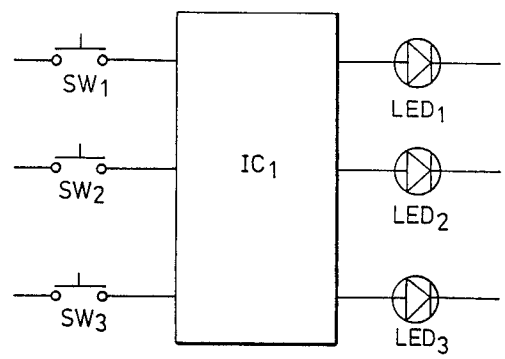
FIG. 2B (TRANSMITTER)
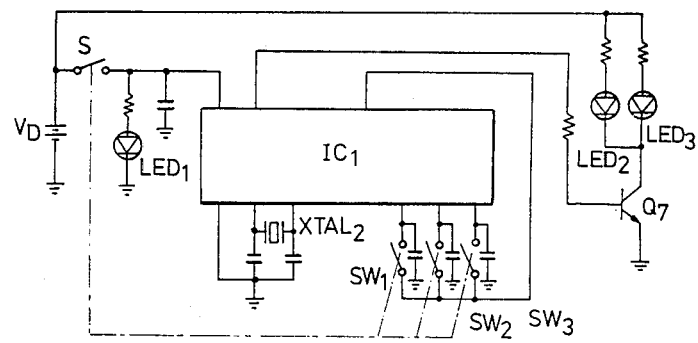

FIG. 2A (RECEIVER)
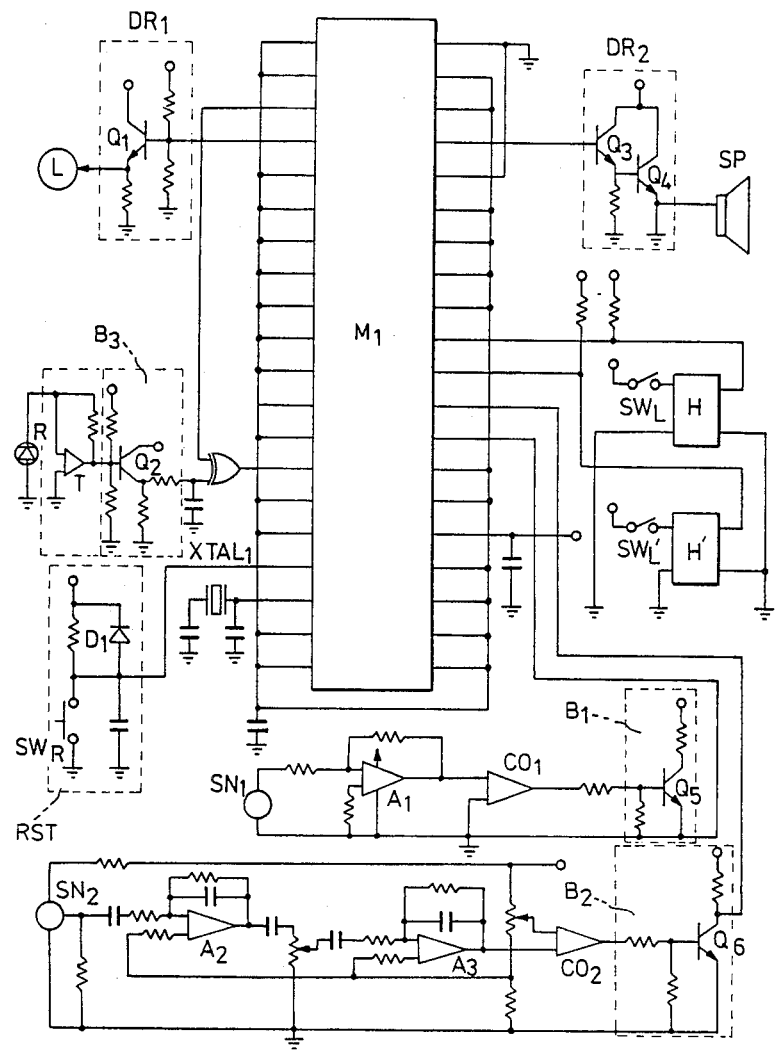

VEHICLE SECURITY SYSTEM

BACKGROUND OF THE INVENTION

This invention relates generally to security systems for use with vehicles and particularly to a new vehicle security system which is useful for night workers to secure themselves against a burglar previously hidden within their vehicles at night.

Recently, a three-shift work system has been frequently enforced in many organizations such as hospitals or the like. In the three-shift system, a second shift is usually relieved during the late night from 10 p.m. through 12 p.m. And, in these days, there are frequent occasions when a burglar who aims at night shifts illegally enters and hides himself within their vehicles for the purpose of seizing them of their pocket moneys and other belongings. When one who finished his night work and wishes to go home unfortunately comes close to and rides in his own car without being aware of the situation that a burglar was in hiding within the car (in fact, it is very difficult to aware that situation during the night at a distance), he will be attacked by the burglar and this brings him a loss of his property and sometimes even his life.

Though there have been proposed a number of vehicle security systems including alarm units which are intended to give a warning of an illegal attempt to enter a car by producing an alarm whenever the door of the car is opened by a person other than the owner theirof through electrical detection of the door opening, many of these alarm systems are useless during the night when there is little traffic in the vicinity that the car is being tampered with. Additionally, a professional offender is sometimes able to deactivate such alarm units in simple manner so that the alarm does not sound at all or operate for only a brief period insufficient to warn people in the vicinity that the car is being tampered with. This fails to prevent an unauthorized entry and, of course, to give the vehicle owner proper security.

SUMMARY OF THE INVENTION

Accordingly, it is an object of the invention to provide a new vehicle security system which is useful for night workers to secure themselves against a burglar previously hidden within their vehicles at night.

In accordance with the invention, there is provided a vehicle security system comprising a portable transmitter for producing infrared remote control signals, and a receiver mounted within the car and receiving said infrared remote control signals;

said receiver including a first sensing unit for sensing the weight of a burglar hidden in the car, a second sensing unit for sensing thermal infrared rays produced from the burglar's body, an infrared receiving unit for receiving said infrared remote control signals from the transmitter, a lamp switch unit for producing a lamp switching signal by means of manual handling, a microprocessor for inputing data transmitted from said units and producing certain control signals, a lamp unit for turning on or off a room lamp of the car in response to said control signals from said microprocessor; and an alarm unit for generating an audible warning via a speaker in response to said control signals from said micro processor.

BRIEF DESCRIPTION OF THE DRAWINGS

The accompanying drawings illustrate the embodyment of the invention. In such drawings:

FIG. 1A is a block diagram of the receiver in accordance with the invention;

FIG. 1B is a block diagram of the remote control transmitter in accordance with the invention;

FIG. 2A is a detailed circuit diagram of FIG. 1A; and

FIG. 2B is a detailed circuit diagram of FIG. 1B.

DETAILED DESCRIPTION OF THE INVENTION

A vehicle security system does, according to this invention, consist of a portable transmitter for producing infrared remote control signals, and a receiver mounted within a car and receiving said infrared remote control signals. As shown in FIG. 1B, the transmitter includes three command switches $SW_1$ to $SW_3$, a modulator $IC_1$ made of intergrated circuit, a light emitting diode $LED_1$ for indicating "IN USE" of the transmitter, and two infrared ray emitting diodes $LED_2$ and $LED_3$ for radiating a certain infrared ray having an information corresponding to the instruction of said respective control switches $SW_1$ to $SW_3$.

A receiver, as shown in FIG. 1A, includes the first sensing unit 1 for sensing the weight of a burglar hidden in a car to generate an electrical signal, the second sensing unit 2 for sensing thermal infrared rays produced from the burglar's body to generate an electrical signal, an infrared receiving unit 3 for receiving the foregoing infrared remote control signals from the transmitter, a lamp switch unit 6 for producing a lamp switching signal by means of manual handling, a microprocessor $M_1$ receiving data transmitted from said units 1, 2, 3 and 6 and producing certain control signals, a lamp unit 4 for turning on or off the room lamp L of the car in response to said control signals from the microprocessor $M_1$, and an alarm unit 5 for generating an audible warning via a speaker SP in response to said control signals from the microprocessor $M_1$.

In FIG. 2B illustrating the detailed circuit of the transmitter, reference symbol S indicates power switch linked with the command switch $SW_1$ to $SW_3$. Crystal oscillator $XTAL_2$ connected with terminals $OS_1$ and $OS_2$ of the modulator $IC_1$ generates the signal transmission carrier. Comman switches $SW_1$ to $SW_3$ respectively connected with scanner outputs A to C supply three different command inputs to the terminal IN. The modulator $IC_1$ is adapted to modulate the carrier with one of three different command inputs and send the modulated carrier to a transistor $Q_7$ via an ouptut terminal OUT so that the transistor $Q_7$ may be turned on or off and, in turn, infrared ray emitting diodes $LED_2$ and $LED_3$ may radiate certain infrared remote control signals.

Referring to FIG. 2A, which shows the detailed circuit of the receiver, the piezoelectric sensor $SN_1$ transduces gravity of the burglar hidden in the car to electrical signal.

The amplifier $A_1$ comprising an operational amplifier and three resistors amplifies said electrical signal and supply it for an input terminal of the comparator $CO_1$.

The comparator $CO_1$, which compares the input signal with the reference (ground potential) applied to the other input terminal, produced high level voltage when level of the input signal is the above potential. The output of said comparator is buffered by the buffer $B_1$ which consists of an transistor $O_5$ and resistors, and is applied to input port Ca of the microprocessor $M_1$.

Further, the thermal infrared ray sensor $SN_2$ generates electrical signal when thermal infrared ray as produced from the burglar's body, is detected. Taking into account feebleness of said thermal infrared ray, the output of said sensor $SN_2$ is amplified by amplifiers $A_2$ and $A_2$ coupled in cascade.

Each of amplifiers $A_2$ and $A_3$ is individually provided with an operational amplifier, resistors and condensors and is of the same construction. The output of said amplifier $A_3$ is applied to an input terminal of the comparator $CO_2$ and is compared with the reference applied to the other input terminal of the comparator $CO_2$ by a potentiometer.

When the output of said amplifier $A_3$ is higher than the reference, the comparator $CO_2$ produces high level voltage. The buffer $B_2$ having a transistor $Q_6$ and resistors functions buffering of its input signal. The output of the buffer $B_2$ is connected with input port Cb of the microprocessor $M_1$.

Lamp switches $SW_L$ and $SW_L'$ mounted inside the car are respectively connected with input ports Cc and Cd through optic couplers H and H', which obviate the bouncing effect due to turning on of said switches. Crystal oscillator XTAL, and condensors connected between terminals CK and X of the microprocessor $M_1$ supplies clock signals for CPU. Reset circuit RST consists of a resistor, a diode, a push switch and a condensor and grants a reset pulse to CPU through the terminal RESET.

The infrared sensor R for receiving infrared remote control signals from the transmitter is coupled to the convertor T which converts current signal to voltage signal. The convertor T is, in turn, coupled to an input terminal of Exclusive OR gate G, the other input terminal of which is coupled to output port Ba of the microprocessor $M_1$. The output of said gate G is coupled to terminal INT of the microprocessor $M_1$ and interrupts CPU when infrared remote control signals are reached, unless any signal is not emitted from output port Ba of the microprocessor $M_1$. Output port Bb is linked with the room lamp L in the car via the lamp driver $DR_1$, which comprises a transistor $Q_1$ and registors. Also output port Bc is linked with the speaker SP in the car via the speaker driver $DR_2$, which comprises two transistors $Q_3$ and $Q_4$ and resistors. In the drawing, symbol $V_{DD}$ and $V_{SS}$ indicate power source terminals of the microprocessor $M_1$.

The operation of the vehicle security system according to the invention will be more detailed in the following description.

At first, when one pushes the switch $SW_1$ of the transmitter at a certain distance from the place that the car is being parked, an infrared remote control signal for turning on the room lamp L of the car is produced from infrared emitting diodes $LED_2$ and $LED_3$ of the portable transmitter, and the signal is transmitted to the receiving unit 3 of the receiver mounted within the car through the infrared sensor R. In the receiving unit 3, the infrared signal received through the infrared sensor R is converted into an electrical signal via a converter T, and the electrical signal from the converter T is applied to the microprocessor $M_1$ through a buffer amplifier $B_3$. Then, the microprocessor $M_1$ produces predetermined signals to the lamp unit 4 and the alarm unit 5 so as to be able to turn on the room lamp L and produce a click sound through a speaker SP at the same time. When the room lamp L is not lighted in spite of the switch $SW_1$ being pushed, it is understood that the receiver has been deactivated or destroyed by a hidden burglar.

The operation of turning off the room lamp being lighted on is performed by using the switch $SW_2$ of the portable transmitter in a same manner as described above.

The room lamp is also controlled by the lamp switch $SW_L$ or $SW_L'$ fitted on the ceiling pane or on the instrument board of the car through manually handling in a conventional manner. Now, considering the situation that a burglar was in hiding within the car beneath the back seat and the like.

The presence of the burglar is detected by a piezoelectric sensor $SN_1$ which senses the weight applied to the back seat and the like, and produces an electrical signal. The signal produced from piezoelectric sensor $SN_1$ is applied to the microprocessor $M_1$ via an amplifier $A_1$, a comparator $CO_1$, and a buffer amplifier $B_1$ and is stored in a memory in the microprocessor $M_1$. At the same time, a thermic ray sensor $SN_2$ also produces an electrical signal by sensing the thermic rays from the body of the burglar. The signal from the sensor $SN_2$ is also applied to the microprocessor $M_1$ via amplifiers $A_2$ and $A_3$, a comparator $CO_2$, and a buffer amplifier $B_2$ and is also stored in the memory of the microprocessor $M_1$.

The microprocessor $M_1$ refreshes data stored in its memory at predetermined intervals and ascertains whether said sensors $SN_1$ and $SN_2$ produce electrical signals for representing the presence of the burglar.

In this case, if the switch $SW_3$ is pushed, infrared emitting diodes $LED_2$ and $LED_3$ transmit a remote control signal for checking the presence of the burglar to the infrared sensor R of the receiving unit 3, and the infrared sensor R produces an electrical signal. This electrical signal is passed through a converter T and a buffer amplifier $B_3$, and is applied to the microprocessor $M_1$. Then, the microprocessor $M_1$ checks the data stored in its memory. If the data contains a certain value which represents the presence of the burglar within the car, the microprocessor $M_1$ supplies a control signal for the lamp unit 4 to activate the lamp driver $DR_1$ and turn on the room lamp L. And, at the same time, the microprocessor $M_1$ supplies another control signal for the alarm unit 5 to activate the speaker driver $DR_2$ and generate a series of click sounds via the speaker SP. Thereby, the burglar hidden within the car may realize that he is noticed by anyone and must be seized with fear to escape from the car. If so, security of the vehicle owner can be ensured without encountering the burglar. At last, when the vehicle owner pushes the switch $SW_2$ of the portable transmitter, the speaker SP and the room lamp L are turned off and the other components are resetted into the initial state.

What is claimed is:
1. A vehicle security system, comprising:
   (a) a portable transmitter for producing infrared remote control signals,
   (b) a receiver mounted within the car, said receiver, comprising:
      (i) a first sensing unit for sensing the weight of an intruder hidden in the car,

(ii) a second sensing unit for sensing infrared radiation produced by the intruder's body, and
(iii) an infrared receiving unit for receiving said infrared remote control signals from the transmitter,
(c) a tamper indication switch unit for producing a detectable signal in response to manual actuation of said transmitter to determine if the system is intact,
(d) a microprocessor for monitoring and interpreting data transmitted from said sensing units and producing control signals in response to a determination that an intruder is present in said car, and
(e) an alarm unit for generating a warning in response to said control signals from said micro processor.

2. Apparatus as in claim 1, wherein said warning is an audible alarm.

3. Apparatus as in claim 1, wherein said warning is a blinking of the cabin lights.

4. A vehicle security system, comprising:
(a) a portable transmitter for producing remote control signals,
(b) a receiver mounted within the car, said receiver comprising:
(i) a first sensing unit for sensing the weight of an intruder hidden in the car and providing data indicating the absence or presence of an intruder,
(ii) a second sensing unit for sensing infrared radiation produced by the intruder's body and providing data indicating the presence of an intruder,
(iii) receiving unit for receiving said remote control signals from the transmitter,
(c) a tamper indication switch unit for producing a tamper indication signal in response to manual actuation of said transmitter,
(d) a microprocessor for storing and refreshing, at predetermined intervals, data transmitted from said sensing units and producing control signals in response to a determination that an intruder is present in said car; and
(e) an alarm unit for generating a warning in response to said control signals from said microprocessor.

5. Apparatus as in claim 4 wherein said warning is an audible alarm.

6. Apparatus as in claim 4 wherein said warning is a blinking cabin light.

7. Apparatus as in claim 4 wherein said control signals are infrared control signals.

* * * * *